April 27, 1954
R. A. KIRKMAN
2,677,058
METHOD AND APPARATUS FOR CONTROLLING THE FREQUENCY
OF HIGH-FREQUENCY GENERATING APPARATUS
Filed Sept. 27, 1949
4 Sheets-Sheet 1
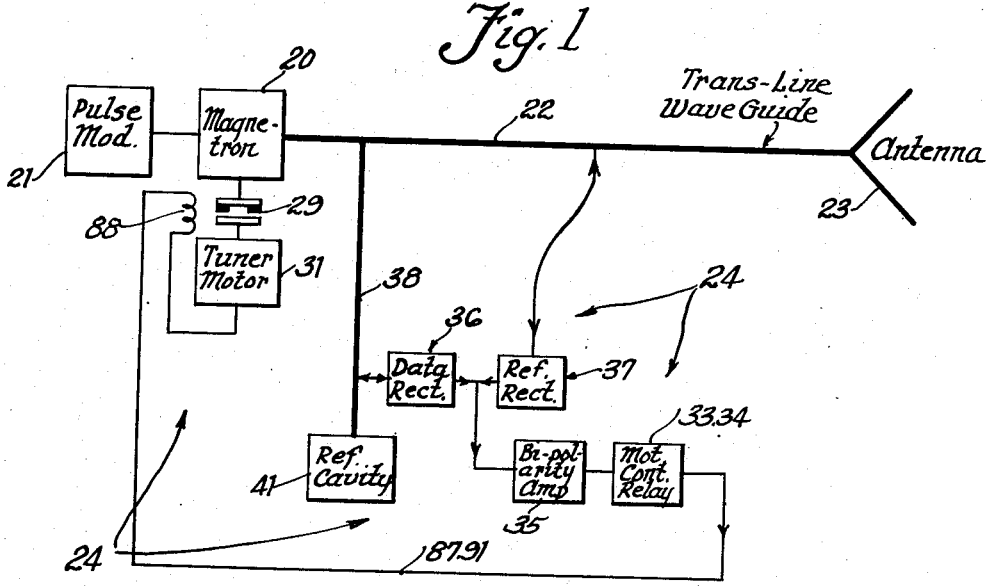
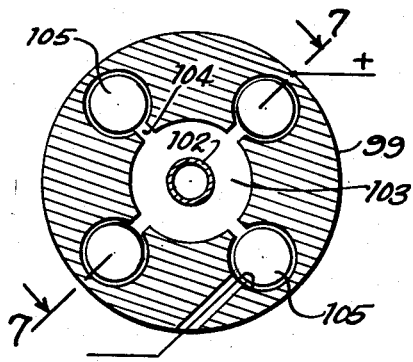
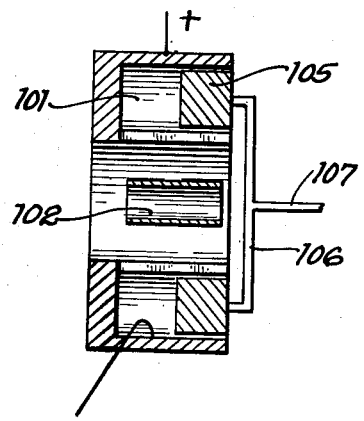
INVENTOR.
Robert A. Kirkman
BY
Thiess, Olson & Mecklenburger
Att'ys April 27, 1954      R. A. KIRKMAN      2,677,058
METHOD AND APPARATUS FOR CONTROLLING THE FREQUENCY
OF HIGH-FREQUENCY GENERATING APPARATUS
Filed Sept. 27, 1949      4 Sheets-Sheet 2
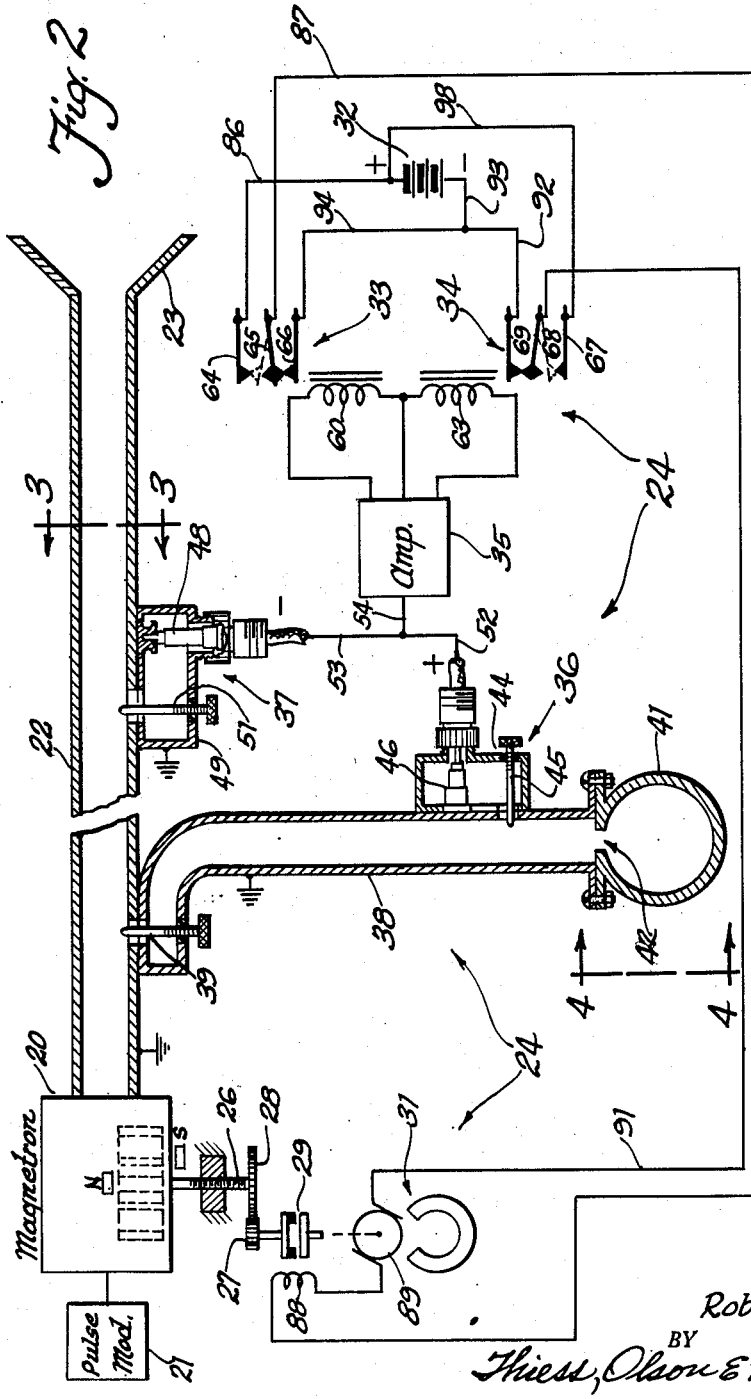
INVENTOR.
Robert A. Kirkman
BY
Thiess, Olson & Mecklenburger
Att'ys April 27, 1954

R. A. KIRKMAN 2,677,058

METHOD AND APPARATUS FOR CONTROLLING THE FREQUENCY
OF HIGH-FREQUENCY GENERATING APPARATUS

Filed Sept. 27, 1949

INVENTOR.
Robert A. Kirkman
BY
Thiess, Olson & Mecklenburger
Att'ys

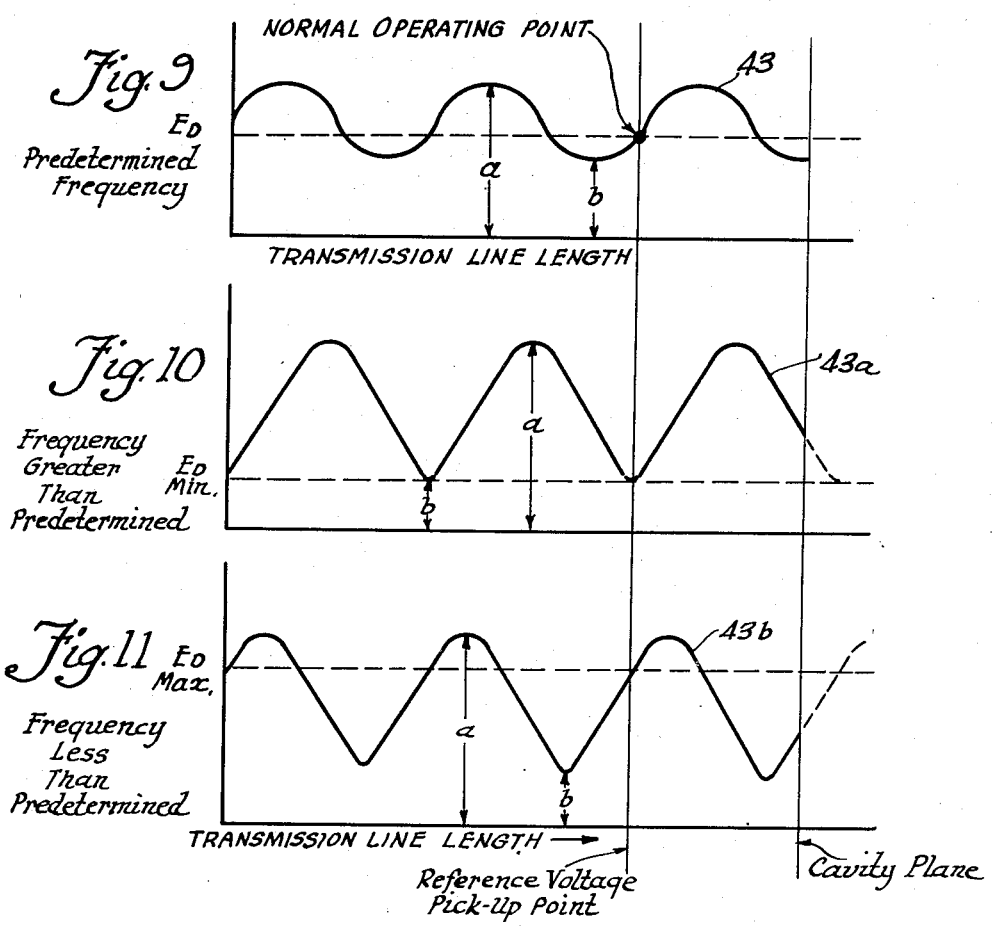
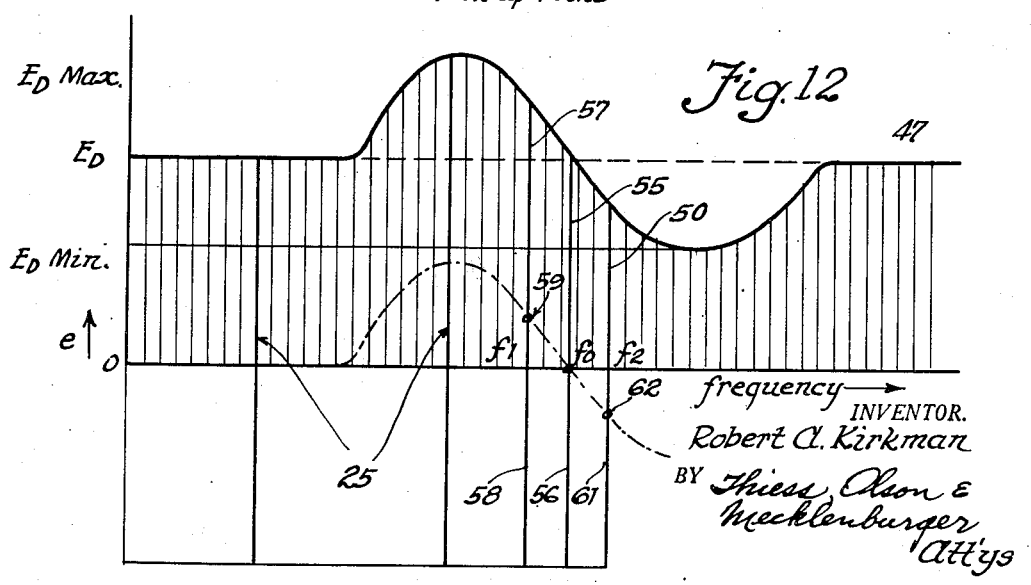

Patented Apr. 27, 1954

2,677,058

UNITED STATES PATENT OFFICE 2,677,058

METHOD AND APPARATUS FOR CONTROLLING THE FREQUENCY OF HIGH-FREQUENCY GENERATING APPARATUS

Robert A. Kirkman, Chicago, Ill., assignor to Cook Electric Company, Chicago, Ill., a corporation of Illinois Application September 27, 1949, Serial No. 118,038

7 Claims. (Cl. 250—36)

This invention relates to microwave generating apparatus, more particularly to a method and means for controlling the frequency thereof, and it is an object of the invention to provide an improved method and means of this character.

It is a further object of the invention to provide an improved method and means for controlling the frequency of a microwave generator, for example a magnetron generator.

It is a further object of the invention to provide improved apparatus for utilizing the effects of changes in frequency of microwaves to control such frequency.

It is a further object of the invention to provide an improved method for obtaining a control signal from microwaves, which signal varies from zero to a positive value and from zero to a negative value as the frequency of the microwaves changes from one side of a predetermined value to the other side.

It is a further object of the invention to provide improved apparatus for controlling the frequency of a microwave generating apparatus which shall be small in size, efficient in operation, and economical to manufacture.

Microwave apparatus may comprise, a microwave generator such, for example, as a pulse modulated magnetron, means connected to the magnetron for transmitting the pulse modulated waves to any desired point, for example wave guides of the hollow or coaxial type, and utilization means such, for example, as an antenna attached to the end of the wave guide for radiating the energy into the atmosphere. Apparatus of this character may, for example, be a radar beacon which transmits a recognition signal, the beacon being set into operation by approaching aircraft transmitting an appropriate signal.

In apparatus of the radar beacon type or any other microwave apparatus requiring the generation, transmission, and utilization of microwave energy, it is desirable and even imperative that the frequency of the microwave energy be maintained within predetermined narrow limits or substantially at a specified value.

Magnetron tubes are one form of microwave generators, and they may generate frequencies of the order of $10^{10}$ cycles per second for use in radar or similar applications. Deviations of several millions of cycles per second from such a predetermined value may occur during operation, and while such a deviation seems large in magnitude it is a very small percentage of the total frequency. Nevertheless, deviations of even this small percentage cannot be tolerated and must be eliminated. While it is known that electrical effects associated with ultra high frequencies change with the frequency, the changes accompanying small percentage changes in frequency ordinarily are so small as to be ineffective for control purposes. Accordingly, it is a further object of the invention to provide, in apparatus of the foregoing character, improved means effective upon small percentage changes in frequency for maintaining constant frequency.

In carrying out the invention in one form, apparatus is provided for maintaining the frequency of an ultra high frequency energy source at substantially a predetermined value comprising, means for transmitting the energy of the source to a utilization point, means for setting up standing waves including means for abstracting a portion of the energy from the transmitting means, means for obtaining a first voltage from said standing waves, the first voltage having a certain polarity and amplitude at the predetermined frequency, means for obtaining a second voltage from the high frequency energy in the transmitting means equal in amplitude but opposite in polarity to the first voltage at the predetermined frequency, means for obtaining the difference of these voltages, and means for utilizing the difference thereof for controlling the frequency of the source.

In carrying out the invention in another form, there is provided, in a microwave generating system, a method for maintaining a predetermined frequency of the microwaves comprising, setting up a standing wave pattern from said generated microwaves, utilizing the variations of the standing wave pattern with variations in frequency to obtain a correspondingly varying signal, utilizing the generated microwaves to obtain a signal equal in magnitude but opposite in polarity to said first named signal, and utilizing the difference in said signals to control adjustment of the microwave generator.

For a more complete understanding of the invention, reference should be had to the accompanying drawings, in which Figure 1 is a line and block diagram of apparatus embodying the invention;

Fig. 2 is a schematic view similar to Fig. 1 but illustrating the structure in somewhat more detail;

Fig. 3 is a sectional view taken substantially along the lines 3—3 of Fig. 2;

Fig. 4 is a side elevational view taken substantially in the direction of arrows 4—4 of Fig. 2;

Fig. 5 is a diagrammatic view of certain components shown in Fig. 2;

Fig. 6 is a sectional view illustrating one form of a magnetron tube;

Fig. 7 is a sectional view taken substantially along line 7—7 of Fig. 6;

Fig. 8 is a circuit diagram of the amplifier shown in block form in Fig. 2;

Fig. 9 is a diagram illustrating a possible standing wave pattern existing at a predetermined frequency in a portion of the apparatus shown in Fig. 2;

Fig. 10 is a diagram illustrating one form of the standing wave pattern of Fig. 9 after a frequency change in one direction from the predetermined frequency;

Fig. 11 is a diagram illustrating one form of the standing wave pattern of Fig. 9 after a frequency change in the opposite direction from the predetermined frequency;

Fig. 12 is a diagrammatic view illustrating the form of control signal obtained with the apparatus embodying the invention with changes in frequency; and Fig. 13 is a diagrammatic view illustrating the form of microwave energy utilized in apparatus embodying the invention.

Referring to the drawings, and particularly to Figs. 1 and 2 thereof, the invention is shown embodied in microwave generating, transmitting, and control apparatus comprising a magnetron generator 20 fed by a pulse modulator 21, a hollow wave guide 22 supplied by the magnetron, a horn antenna 23 for radiating the energy transmitted by the wave guide, and control apparatus 24 for maintaining the frequency of the magnetron at a predetermined value. This apparatus may, for example, comprise the operating components of a radar beacon for supplying recognition signals to aircraft.

Other types of ultra high frequency generators may be used instead of a magnetron, and one form of magnetron may, for example, be of the type designated as QK 181–JAN. Wave guide 22, while shown as being rectangular in cross section (Fig. 3), may be circular in cross section or of any other suitable cross section so long as the dimensions are properly chosen to transmit efficiently waves of the desired frequency. Antenna 23, while shown as being of the horn type, may also be of any other suitable form so long as the antenna has its impedance properly matched to that of the wave guide 22 in order to prevent reflection losses. While the magnetron 20 has been shown as being pulse modulated to produce the desired output, it will be understood that other methods of exciting the magnetron well known to the art may be used.

When the apparatus as thus far described is operating, the magnetron generator 20 produces a series of pulses 25 of high frequency oscillations (Fig. 13), the spacing of these pulses being determined by the rate at which the pulse modulator excites the magnetron. The duration of the pulses, the frequency of the oscillations therein, and the length of time between pulses, i. e., the repetition rate, may be chosen in accordance with any particular conditions. The pulses of high frequency energy 25 are propagated along wave guide 22 and are radiated to the atmosphere by antenna 23.

The frequency within the pulses may be varied by any well-known means, for example such as by changing the volumes of the various cavities in the anode structure of the magnetron, as will be more completely described subsequently in this specification. Such an adjustment may be made, for example, by an adjusting screw 26 driven by a motor 31 through a pair of gears 27 and 28 and a magnetic clutch 29. Power for driving the motor 31 is supplied from a suitable source, such, for example, as a battery 32, through the contacts of a pair of relays 33 and 34 which are controlled by an amplifier 35, the amplifier being excited or controlled from a pair of detecting units or rectifiers 36 and 37.

During operation of the control system, motor 31 and clutch 29 remain unenergized while the generated frequency is at its predetermined value. When the frequency changes to higher or lower values, the motor 31 and the clutch 29 are energized, the motor running in different directions for the respective frequency deviations. Consequently, the adjusting screw 26 varies the frequency determining structure of the magnetron in the proper direction to bring the frequency back to the predetermined value. At the latter instant the relays effect deenergization of the motor and clutch.

Rectifier or detecting unit 36 may be termed the data rectifier inasmuch as its prime function is to detect or produce an effect corresponding to changes in the generated frequency.

Data rectifier 36 is associated with a wave guide 38 attached to wave guide 22, as shown, and having the same transmitting properties. At the junction of wave guides 22 and 38 a probe 39 is arranged to project into wave guide 22 a small distance through a suitable opening as shown, the probe being insulatingly and threadably mounted in guide 38 in order that it may be made to project into guide 22 any suitable amount. Probe 39 abstracts a small percentage of the energy within guide 22 and causes this abstracted energy to propagate waves of high frequency energy within guide 38. The percentage of energy abstracted may be very small, such, for example, as 2%, and thus does not disturb to any appreciable extent the energy being propagated along guide 22.

Wave guide 38 is terminated in a cylindrical cavity 41 (see also Fig. 4) which is resonant to the predetermined frequency intended to be maintained by the magnetron and may be termed the reference cavity. The reference cavity is provided with an opening 42 through which the cavity is excited by energy from wave guide 38, the dimensions of opening 42 being so chosen, preferably, that standing waves are set up in guide 38. That is to say, guide 38 is not terminated in its characteristic impedance throughout the range of frequency control although it may be matched at some one frequency, and thus throughout most of the range reflections occur which cause the standing waves. In Fig. 9 there is shown one possible form of standing wave pattern which may exist in guide 38 with termination as specified.

As illustrated by Fig. 9, the field strength within guide 38 or the voltage after detection varies in an undulating fashion, e. g., wavy line 43, along the length of the guide. The standing wave ratio $a/b$, that is, the ratio of the maximum to the minimum of the standing wave, may be made of any value by proper selection of the structure but preferably is made relatively large over most of the range of frequency control. It is understood in this art that the standing wave pattern as shown by wavy line 43 represents the field pattern within guide 38 which is stationary at the particular frequency. As the predetermined frequency increases, the standing wave pattern shifts along the wave guide and also changes in shape so that one form of resulting standing wave pattern may be that shown by wavy line 43a in Fig. 10. Correspondingly, when the frequency decreases below the predetermined value, the standing wave pattern shifts along the length of the guide in the opposite direction and also changes its form so that one form of resulting standing wave pattern may be that shown by wavy line 43b in Fig. 11.

It is to be understood that the standing wave patterns shown in Figs. 9, 10, and 11, while patterns for one form of apparatus and particular adjustments thereof as actually utilized, are exemplary only, these patterns being dependent upon the constants of the particular apparatus, and may be made to vary by changes therein. As one example of this, it is known that by terminating wave guide 38 with a resonant cavity having a resistive input impedance equal to the characteristic impedance of the wave guide 38, there would be no standing waves in guide 38 and the wavy line 43 of Fig. 9 would degenerate into a straight horizontal line spaced at some ordinate above the axis. With such structure, standing waves would be produced in the wave guide when the frequency varies and the standing wave pattern would change in form as the frequency varies above and below the predetermined value.

The structure chosen for any particular apparatus is such that the changes in voltage detected by unit 36 varies in a usable fashion relative to changes in frequency. The position of probe 45 relative to the cavity plane of cavity 41 consequently is a somewhat critical spacing.

In accordance with the foregoing principles, the detecting unit 36 comprises a housing 44 attached to guide 38, a probe 45 projecting into the guide, and a detector or crystal element 46. The probe 45 abstracts a small percentage of energy from guide 38 and sets up a field inside of housing 44, the housing having dimensions corresponding to those of guide 38. The detector element 46 may consist of a rectifying material such as a germanium crystal connected to a metallic portion for deriving a voltage from the field in housing 44. One end of the crystal is grounded to housing 44 as shown, and the crystal is so oriented that the ungrounded end develops a positive data voltage.

The position of probe 45 relative to the cavity plane of cavity 41 (adjacent opening 42 is placed so as to obtain a normal operating point or voltage from crystal 46 equal to $E_D$ (Fig. 9). Housing 44 and probe 45 may be moved along guide 38 to effect this. Continued movement along the complete length of guide 38 may produce a voltage corresponding to all points along wavy line 43. A normal operating point as shown is so chosen that the change in the data voltage with decreasing frequencies is substantially the same in magnitude but opposite in sign to the data voltage with increasing frequencies over the intended range of operation. A selection of resonant cavity 41 may be made and the position of probe 45 may be so chosen that the variation of the data voltage with frequency may approximate an S curve as shown by the solid line 47 in Fig. 12. In this figure the various ordinates represent the pulses of high frequency waves 25, and the spacing of the ordinates represents the repetition time.

Since the probe 45 remains fixed once the operating point has been selected, it may be noted that, with the factors chosen, the field within housing 44 and consequently the data voltage of crystal 46 decreases as the frequency is increased, as may be seen by comparing Figs. 10 and 12. A continued increase in frequency results in the data voltage becoming a minimum and gradually returning to the normal value. Correspondingly, when the frequency is decreased, the field within housing 44 and consequently the data voltage of crystal 46 increases, as may be seen by comparing Figs. 11 and 12, a continued decrease in the frequency resulting in the voltage returning to its normal value. With some adjustments, the S curve may not return to the $E_D$ value. This is of advantage since it extends the control range.

The $E_D$ line 47 (Fig. 12) thus represents a change in amplitude of the data voltage in accordance with changes in frequency, and consequently may be used in a fashion to be described to control the motor 31 and hence the generated frequency.

The data voltage $E_D$ as chosen has a positive value above and below which it changes with changing frequency. For example, if the value of $E_D$ were 10 volts normally, it is necessary that the control apparatus function to change the frequency in one direction when the value of $E_D$ changes to 11 volts and to change the frequency in the other direction when the value of $E_D$ changes to 9 volts. In general, it is a simpler matter to utilize a control voltage varying above and below zero than it is to utilize a control voltage varying above and below some value other than zero. Accordingly, the second detecting unit 37 is so arranged along wave guide 22 and a crystal element 48 is mounted therein for producing a voltage equal in magnitude but opposite in polarity to the normal value of $E_D$. The voltage of crystal 48 is bucked against the voltage of crystal 46 so that the voltage output of the two crystals together is zero at the predetermined frequency.

Crystal 48 may resemble crystal 46 in all respects but is mounted with the end of opposite polarity grounded on the housing 49 of unit 37 so as to produce a negative voltage.

A probe 51 extends a small distance inside of guide 42 for abstracting a small amount of energy from the waves therein to establish a field inside of housing 49. The probe 51 is spaced a distance from the magnetron 20 approximately equal to the distance of probe 45 from the magnetron. This is desirable in order that the bucking voltages, i. e. pulses, from the two crystals begin at the same time and end at the same time subsequently, as will be more clearly described later in this specification.

Referring to Fig. 5, there is shown schematically the equivalent circuit of the crystals 46 and 48, the probes or conductors for deriving voltages from the fields to be applied to the crystals being shown disposed in fields indicated by the parallel lines 38F and 22F. The crystals are connected effectively in a series circuit since different terminals thereof are connected to ground as shown, that is to say, to the metal forming the various wave guides, and the corresponding other terminals of the crystals are connected together by conductors 52 and 53 from which extends a conductor 54 for feeding the difference voltage to the amplifier 35.

Referring more particularly to Fig. 12, the ordinate $f_0$ represents the predetermined frequency at which the magnetron is intended to operate, and the positive ordinate 55 at the frequency $f_0$ represents the data voltage of crystal 46. At this same frequency, the probe 51 having been properly positioned and inserted into guide 22 a sufficient distance to produce the proper value of field inside of housing 49, the negative voltage developed by crystal 48 is represented by the negative ordinate 56 which occurs exactly at the point of ordinate 55, whereupon the voltage at conductor 54 is zero. Suppose that the frequency decreased to $f_1$ where the standing wave pattern has shifted, as described in connection with Fig. 11, and consequently the data voltage developed by crystal 46 is represented by ordinate 57. At this point the voltage developed by crystal 48 remains in magnitude as before inasmuch as the wave guide 22 has no standing waves therein and is represented by negative ordinate 58 occurring in exact opposition to ordinate 57, since the same pulse produces both signals. Consequently, the voltage appearing at conductor 54 is a positive voltage represented by point 59. If the frequency continues to decrease, the data voltage developed by crystal 46 continues to be represented by the positive ordinates underneath the S curve (shown solid) to the left of $f_1$, the negative voltages of crystal 48 represented by the negative ordinates always subtracts from the data voltages, and the result is a voltage appearing at conductor 54 as represented by the curve shown dotted. Correspondingly, if the frequency increases a small amount, the data voltage developed by crystal 46 decreases and may be represented by ordinate 59. The crystal 48 developing a reference voltage equal in value as previously, may be represented by the negative ordinate 61. Accordingly, the voltage appearing at conductor 54 is negative and may be represented by point 62. Continued increase in frequency results in a wave of voltage (shown dotted) corresponding to the waves shown in solid lines but existing relative to the zero axis. Although not shown in Fig. 5, load resistors of equal value connected across crystal detectors may be found advantageous in some cases. Similarly, series equalizing and isolating resistors may be connected in conductors 52 and 53 for equalizing the performance of the crystals.

With the foregoing structure and explanations in mind, the operation of the invention and additional structure may best be understood by considering the operation in detail. In this connection, reference is made particularly to Figs. 2 and 8.

Fig. 8 is a circuit diagram of one form of amplifier which has been found suitable, it being an amplifier capable of amplifying both positive and negative pulses faithfully. The types of tubes and the constants of the various circuit components are shown on the drawing and are not repeated in the specification. It is understood that these constants are exemplary and that other circuits may be devised which will function in a proper manner. It is noted that care should be used in selecting the various coupling condensers and resistors between the tubes so that pulses of voltage suitable in duration and amplitude for operating vacuum tubes 71 and 72 are amplified and supplied to the grid circuit through points 83 and 96. It is not believed necessary to describe the complete circuit in detail, but only such components as enter unobviously into the operation.

Relays 33 and 34 may comprise coils 60 and 63 and appropriate contacts, i. e., a series of contacts 64, 65, and 66 for relay 33, and a series of contacts 67, 68, and 69 for relay 34. Coils 62 and 63 are normally energized, that is, when the voltage of conductor 54 is zero (generated frequency is correct), coils 60 and 63 are energized, and consequently contacts 65 and 66, and 68 and 69 are closed. This occurs by virtue of the fact that the grids of amplifier tubes 71 and 72 are at ground potential and a voltage of approximately 90 volts is applied to their plates, the relay coils 60 and 63 being in the plate circuits of the respective tubes. Tubes 71 and 72 are tubes which, with the connections as shown, supply sufficient current to cause functioning of the relays.

Suppose that the frequency of the magnetron 20 increases from $f_0$ value to $f_2$, as a consequence of which the grid of the initial tube 73 in the amplifier receives a negative voltage pulse. This pulse is amplified in tube 73, and the amplified voltage appears across resistor 74. Since the output voltage of tube 73 is taken off between the plate of the tube and a resistor 75, the negative input pulse appears as a positive pulse across resistor 74. The positive pulse passes through rectifier 76 to the grid of tube 77 but is blocked by rectifier 78. Tube 77 is not used to perform any amplification but acts as a phase inverting tube so that the positive pulse entering its grid emerges as a negative pulse in the output circuit, i. e., across resistor 79. This negative pulse is fed in part to the grid of tube 81 operating as a class A amplifier. A rectifier 82 is connected from the grid of tube 81 to ground to by-pass any lingering positive pulses which appear. The negative pulse on the grid of tube 81 biases this grid to cutoff, whereupon the plate current stops and the voltage of point 83 rises, thereby causing a positive voltage to appear on the grid of tube 71.

The grid of tube 71 is normally about at ground potential, but when the grid goes positive it collects electrons which, after one or more cycles, drives the grid of this tube sufficiently negative to bias the tube to cutoff. The accumulation of electrons on the grid charges condenser 85, which maintains the grid negative until the charge has leaked off through resistor 84. When tube 71 cuts off, current through relay coil 60 stops and the relay assumes its inactive condition, whereupon the contact 65 moves to engage contact 64 (dotted position). Tube 72 has not received any signal and thus continues to conduct and energize relay coil 63.

At this point a complete circuit for motor 31 and clutch winding 88 is made, as follows: From battery and terminal of battery 32 through conductor 86, contacts 64 and 65, conductor 87, the exciting winding 88 of magnetic clutch 29, the armature 89 of motor 31, conductor 91, contacts 68 and 69, conductors 92 and 93, to the other terminal of the battery. Accordingly, motor 31 and clutch 29 are energized, whereupon the adjusting screw 26 is turned by means of gears 27 and 28 to cause the magnetron to reduce the frequency of the waves it is generating. As the frequency generated by the magnetron decreases toward $f_0$, the negative voltage received by tube 73 of course decreases. However, so long as any negative signal is being received, relay 33 is maintained unenergized. As soon as the magnetron frequency reaches $f_0$, the signal received by tube 73 becomes zero and the grid of tube 71 reaches its normal value. Hence tube 71 conducts, and consequently coil 60 is energized. This causes contacts 65 and 66 to re-engage contacts 64 and 65 to open as shown in solid lines in Figs. 2 and 8, which removes the battery voltage from the series circuit of the motor armature and clutch winding 88. Accordingly, the motor tends to slow down, the clutch plates separate, and the frequency of the magnetron remains at the proper value.

When contacts 65 and 66 engage, a short circuit is placed across the series combination of armature 89 and winding 88. This may be observed by tracing the following circuit: From armature 89 through winding 88, conductor 87, contacts 65 and 66, conductor 94, conductor 92, contacts 69 and 68, and conductor 91 to armature 89. If this short circuit is made immediately, the motor, while slowing down and acting as a generator, would tend to maintain the clutch plates engaged with consequent overswinging of the magnetron adjustment. This would result in driving the frequency below the predetermined value. However, the relay coil 60 de-energizes relatively slowly, whereupon contacts 64 and 65 break relatively slowly and contacts 65 and 66 make relatively slowly. Hence there is an interval of time when the winding 88 is unenergized because of the open circuit between contacts 64 and 65, and during this interval the clutch plates separate. When relay contacts 65 and 66 close, the motor will have slowed down sufficiently so that the voltage generated thereby is insufficient to excite winding 88 to the point where the clutch plates again attract each other.

Assume, now, that the frequency of the magnetron shifts to a lower value than $f_0$, that is, to $f_1$. This causes a positive pulse to be received by the tube 73 through conductor 54. The positive pulse is amplified by tube 73 and appears as a negative pulse across resistor 74. The negative pulse passes through rectifier 78 and develops a negative voltage on the grid of tube 95. The negative pulse is blocked by rectifier 76 and does not affect the operation of phase inverter tube 77. The phase inverter tube is not necessary in this instance inasmuch as the pulse is already negative. The negative pulse on the grid of tube 95 drives this tube to cut off inasmuch as it is operating as a class A amplifier similar to tube 81. Point 96, i. e., the plate of tube 95, receives a positive pulse when tube 95 cuts off, whereupon a positive pulse is applied to the grid of tube 72. Positive voltage on the grid of tube 72 causes this grid to take electrons which drive the grid negative sufficiently far to bias this tube to cutoff, the condenser 97 maintaining this bias until the charge leaks off. When tube 72 cuts off, relay coil 63 becomes unenergized, whereupon contacts 68 and 69 separate and contacts 68 and 67 close (shown dotted in Fig. 2).

This forms a circuit to energize motor 31 for operation in the reverse direction as follows: From one pole of battery 32 through conductor 98, contacts 67 and 68, conductor 91, armature 89, winding 88, conductor 87, contacts 65 and 66, and conductors 94 and 93 to the other pole of the battery. The motor rotates and since winding 88 is energized, the clutch 29 operates the adjusting screw of magnetron 26 to increase the frequency. As the frequency increases toward $f_0$, the amplitude of the data voltage decreases, as may be observed by reference to Fig. 12. However, so long as the data voltage remains above the proper value, the coil 63 remains unenergized. When the frequency reaches the value $f_0$, the voltage of conductor 54 becomes zero, whereupon tube 72 becomes conducting and relay coil 63 becomes energized to move contacts 68 and 69 into engagement, thereby short-circuiting the motor armature and clutch winding 88. The magnetron is now operating at the proper frequency. As described in connection with the previous example of operation, the operation of the contacts is sufficiently slow so that the motor when operating as the generator does not drive the magnetron adjusting screw. Accordingly, over-compensation of the frequency is prevented.

Motor 31 preferably is of the type having a permanent magnet field, although other forms of motors may be used.

As has been indicated, it is highly desirable that the probe 51 of the reference crystal 48 be disposed along wave guide 22 so that the pulses from the reference crystal 48 are opposite in polarity or phase and equal in magnitude to the pulses from data crystal 46. This is necessary to prevent erratic operation of the relays and, consequently, erratic variations of the magnetron frequency.

The high frequency pulses generated by the magnetron travel along the wave guide 22 and along the wave guide 38 with velocities depending upon the transverse dimensions of the guides. If the probe 51 is at a different distance from the magnetron than probe 45, the front of the pulses of energy arrive at one probe ahead of the other probe, and the rear of the pulses would leave the one probe ahead of the other probe. Consequently, assuming that the frequency of the magnetron is at its proper value but the spacing of probe 51 is not correct, then the conductor 54 would receive either a positive or a negative signal at the beginning of the pulse and the opposite thereof at the end of each pulse instead of having zero voltage throughout the pulse. Thus, during each pulse of proper generated frequency, conductor 54 is placed at a voltage other than zero at the beginning and end of the pulse, and as a result one or the other of the relays operates to cause frequency correction, as already described, when actually no correction is wanted. The same situation would also occur when the conductor 54 detects a proper signal calling for a frequency change. The described condition is prevented by spacing probe 51 as described.

Other means of setting up standing waves in a wave guide such as guide 38 are known. For example, the end of wave guide 38 could be closed by a conducting plate, that is, the end of the wave guide is short-circuited. This short-circuited connection would cause reflections to occur, standing waves would be set up within the wave guide, and as described thus far in this application an operating point on the standing wave could be selected. However, the change in position and shape of the standing wave would be inconsequential for the relatively small percentage changes in frequencies which occur. This may be brought clearly into focus by noting that the frequencies generated may be in the order of $10^{10}$ cycles per second while actual frequency variations which occur may be in the order of $2 \times 10^6$ cycles per second.

The small change in standing wave pattern which would occur in the small distance between the end of the wave guide 38 and the position of probe 45, as shown, could be enhanced manyfold by increasing the length of the wave guide 38 while leaving the probe 45 positioned where it is. To obtain a sufficient change in the standing wave pattern and its form by this method would require an extension of the wave guide 38 to a length which is not feasible for most applications—that is, where space is of the essence.

Utilization of the resonant cavity 41 produces the effect needed—that is, a change in the form of the standing wave and a shift in position of sufficient value to produce a usable voltage. This apparently is due to the fact that the resonant cavity is sharply selective—that is to say, it changes its input impedance relatively large amounts for relatively small changes in frequency.

Throughout this specification, changes in form of the standing wave have been dealt with and the causes believed to give the effects needed have been indicated. It is to be understood that the results observed are correct and that other theories for them than the ones given may be advanced. It may be also that all of the factors entering into the changes in form and amplitude have not been given. In some instances these are not known, but in any event the observed results as given are correct.

Referring to Figs. 6 and 7, there is shown one form of generalized magnetron structure which lends itself to adjustability as a frequency generator. A cylindrical metallic body 99 is provided with a series of cylindrical holes 101 spaced around it. A central electrode 102 placed in a cylindrical hole 103 acts as an emitter of electrons. The cylindrical holes 101 communicate with the central cylindrical opening 103 by means of slots 104. One side of the cylindrical holes 101 may be closed by movable pistons 105 connected to a yoke 106 by means of which the pistons may be moved inwardly and outwardly. The frequency of the magnetron, being determined by the dimensions of the cavities defined by the cylindrical holes 101 and pistons 105, varies as the pistons 105 are moved in and out. The stem 107 may be connected to the adjusting screw 26 of Fig. 20 to effect the frequency variations.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Apparatus for maintaining a substantially constant frequency output for an ultra high frequency energy source having frequency varying means comprising, means for adjusting said frequency varying means, means for transmitting the energy of said source to a utilization point, first means for abstracting a portion of the energy from said transmitting means and for setting up standing waves, means for obtaining a data voltage from said standing waves, said data voltage having a certain polarity and amplitude at a certain frequency, means for obtaining a reference voltage from said transmitting means equal in amplitude but opposite in polarity to said data voltage at said certain frequency, means for obtaining the difference of said voltages, and means for utilizing said difference for controlling said adjusting means to return said frequency to said constant value after deviation therefrom.

2. Apparatus for maintaining a substantially constant frequency output for an ultra high frequency energy source having frequency varying means comprising, first wave guide means for transmitting said energy to a utilization point, second wave guide means for excitation by a small portion of the energy in said first wave guide, a cavity resonant to said constant frequency terminating said second wave guide, means for obtaining a data voltage from the energy in said second wave guide, said voltage having a certain polarity and amplitude at said constant frequency and varying from said constant frequency corresponding to frequency variations, means for obtaining a constant reference voltage equal in amplitude but opposite in polarity to said data voltage at said constant frequency from said first wave guide, means for obtaining the difference in said voltages, means for adjusting said frequency varying means, and means for utilizing said difference voltage to operate said adjusting means to return said frequency to said constant value after deviation therefrom.

3. Apparatus for maintaining a substantially constant frequency output for an ultra high frequency energy source having frequency varying means comprising, first wave guide means for transmitting said energy to a utilization point, second wave guide means for excitation by a small portion of the energy in said first wave guide, a cavity resonant to said constant frequency terminating said second wave guide, high frequency rectifier means for obtaining a first voltage from the energy in said second wave guide, said first voltage having a certain polarity and amplitude at said constant frequency and varying from said amplitude corresponding to frequency variations, high frequency rectifier means for obtaining a constant voltage equal in amplitude but opposite in polarity to said first voltage at said constant frequency, means for obtaining the difference in said voltages, means for adjusting said frequency varying means, and means for utilizing said difference voltage to operate said adjusting means to return said frequency to said constant value after deviation therefrom.

4. Apparatus for maintaining a substantially constant frequency output for an ultra high frequency energy source having frequency varying means comprising, first wave guide means for transmitting said energy to a utilization point, second wave guide means for excitation by a small portion of the energy in said first wave guide, a cavity resonant to said constant frequency terminating said second wave guide, means for obtaining a first voltage from the energy in said second wave guide, said voltage having a certain polarity and amplitude at said constant frequency and varying positively or negatively from said amplitude corresponding to respective frequency variations, means for obtaining a constant voltage equal in amplitude but opposite in polarity to said first voltage at said constant frequency, means for amplifying the positive and negative differences of said voltages for controlling said frequency varying means to effect return to said constant frequency after departure therefrom.

5. Apparatus for maintaining a substantially constant frequency output for an ultra high frequency energy source having frequency varying means comprising, first wave guide means for transmitting said energy to a utilization point, second wave guide means for excitation by a small portion of the energy in said first wave guide, a cavity resonant to said constant frequency terminating said second wave guide, means for obtaining a data voltage from the energy in said second wave guide, said voltage having a certain polarity and amplitude at said constant frequency and varying from said amplitude corresponding to frequency variations, means for obtaining a constant reference voltage equal in amplitude but opposite in polarity to said data voltage at said constant frequency from said first wave guide, said reference voltage means being spaced along said first wave guide substantially the same distance from said source as said data voltage means, means for obtaining the difference in said voltages, means for adjusting said frequency varying means, and means for utilizing said difference voltage to operate said adjusting means to return said frequency to said constant value after deviation therefrom.

6. Apparatus for maintaining a substantially constant frequency output for an ultra high frequency energy source having frequency varying means comprising, first wave guide means for transmitting said energy to a utilization point, second wave guide means for excitation by a small portion of the energy in said first wave guide, a cavity resonant to said constant frequency terminating said second wave guide, means for obtaining a data voltage from the energy in said second wave guide, said data means being arranged along said second wave guide means to a point spaced from said reference cavity a distance such that a data voltage of certain polarity and amplitude at said constant frequency and varying from said amplitude corresponding to frequency variations is obtained, means for obtaining a constant reference voltage equal in amplitude but opposite in polarity to said data voltage at said constant frequency from said first wave guide, said reference voltage means being spaced along said first wave guide substantially the same distance from said source as said data voltage means, means for obtaining the difference in said voltages, means for adjusting said frequency varying means, and means for utilizing said difference voltage to operate said adjusting means to return said frequency to said constant value after deviation therefrom.

7. Apparatus for maintaining a substantially constant frequency output for an ultra high frequency energy source having frequency varying means comprising, motor and clutch means for operating said frequency varying means, relay means for controlling operation of motor and clutch means, first wave guide means for transmitting said energy to a utilization point, second wave guide means for excitation by a small portion of the energy in said first wave guide, a cavity resonant to said constant frequency terminating said second wave guide, means for obtaining a first voltage from the energy in said second wave guide, said voltage having a certain polarity and amplitude at said constant frequency and varying positively or negatively from said amplitude corresponding to respective frequency variations, means for obtaining a constant voltage equal in amplitude but opposite in polarity to said first voltage at said constant frequency, means for amplifying the positive and negative differences of said voltages for so energizing said relays to effect return of said generating means to said constant frequency after departure therefrom, said relays preventing overcorrection of said frequency.

References Cited in the file of this patent

UNITED STATES PATENTS

| Number | Name | Date |
| --- | --- | --- |
| 2,452,575 | Kenny | Nov. 2, 1948 |
| 2,474,580 | Hiehle | June 28, 1949 |
| 2,475,074 | Bradley et al. | July 5, 1949 |
| 2,476,311 | Learned | July 19, 1949 |
| 2,502,456 | Hansen et al. | Apr. 4, 1950 |
| 2,562,958 | Smullin | Aug. 7, 1951 |
| 2,593,463 | Kinzer | Apr. 22, 1952 |